United States Patent
Hurley et al.

(10) Patent No.: US 11,263,617 B2
(45) Date of Patent: Mar. 1, 2022

(54) METHOD, NON-TRANSITORY COMPUTER-READABLE MEDIUM, AND MOBILE DEVICE FOR LOCATION-BASED GRAPHICAL USER INTERFACES

(71) Applicant: Apple Inc., Cupertino, CA (US)

(72) Inventors: Timothy S. Hurley, Cupertino, CA (US); David Brudnicki, Cupertino, CA (US); Ahmer Khan, Cupertino, CA (US); Manoj Thulaseedharan Pillai, Cupertino, CA (US); Rupamay Saha, Cupertino, CA (US); Lorraine Meere, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 14/960,279

(22) Filed: Dec. 4, 2015

(65) Prior Publication Data
US 2017/0161716 A1    Jun. 8, 2017

(51) Int. Cl.
*G06Q 30/00*    (2012.01)
*G06Q 20/32*    (2012.01)
(Continued)

(52) U.S. Cl.
CPC ....... *G06Q 20/3224* (2013.01); *G06Q 20/322* (2013.01); *G06Q 30/0641* (2013.01); *H04W 4/023* (2013.01); *H04W 4/21* (2018.02)

(58) Field of Classification Search
CPC ............. G06Q 30/0601–0645; G06Q 20/3224
(Continued)

(56) References Cited

U.S. PATENT DOCUMENTS 8,661,557 B2    2/2014  Ellis et al.
10,255,625 B2 *  4/2019  Liberty ............. G06Q 30/0226
(Continued)

FOREIGN PATENT DOCUMENTS

CN    107589887 A    1/2018
EP    2738661 A2    6/2014
(Continued)

OTHER PUBLICATIONS

Dani, A. S. (2015). Location monitoring application using iBeacon-simulating office environment (Order No. 10020635). Available from ProQuest Dissertations & Theses Global. (1771508833). (Year: 2015).*
(Continued)

*Primary Examiner* — Michelle T Kringen
*Assistant Examiner* — Arielle E Weiner
(74) *Attorney, Agent, or Firm* — Dentons US LLP

(57) ABSTRACT

In some implementations, a mobile device can receive identification information for a merchant store location. The mobile device can receive the identification information when the mobile device is proximate to the store location, for example. The mobile device can obtain graphical user interface (GUI) configuration data for the merchant store location based on the store location identification information. For example, the mobile device can obtain GUI content that has been customized for the merchant store location. The mobile device can configure a GUI of an application installed on the mobile device based on the obtained GUI configuration data. The mobile device can make the proximity application accessible to a user of the mobile device when the mobile device is near the store location.

20 Claims, 13 Drawing Sheets

(51) Int. Cl.
*G06Q 30/06* (2012.01)
*H04W 4/02* (2018.01)
*H04W 4/21* (2018.01)

(58) Field of Classification Search
USPC .............................................. 705/26.1–27.2
See application file for complete search history.

(56) References Cited

U.S. PATENT DOCUMENTS

| | | | |
|---|---|---|---|
| 10,437,611 B2 | 10/2019 | Forstall et al. | |
| 10,496,705 B1 | 12/2019 | Irani et al. | |
| 2007/0244872 A1* | 10/2007 | Hancock | G06F 17/30864 |
| 2008/0004888 A1* | 1/2008 | Davis | G06Q 20/3224 |
| | | | 705/26.1 |
| 2010/0262928 A1 | 10/2010 | Abbott | |
| 2011/0093567 A1 | 4/2011 | Jeon et al. | |
| 2012/0158545 A1* | 6/2012 | Chen | G06Q 30/0623 |
| | | | 705/26.61 |
| 2013/0132941 A1* | 5/2013 | Lindeman | H04W 4/001 |
| | | | 717/176 |
| 2013/0166332 A1* | 6/2013 | Hammad | G06Q 40/10 |
| | | | 705/5 |
| 2013/0290203 A1* | 10/2013 | Purves | G06Q 50/01 |
| | | | 705/319 |
| 2013/0311600 A1 | 11/2013 | McDiarmid et al. | |
| 2014/0074605 A1* | 3/2014 | Sanchez | G06Q 30/0267 |
| | | | 705/14.53 |
| 2014/0172627 A1* | 6/2014 | Levy | G06Q 30/0631 |
| | | | 705/26.7 |
| 2014/0201681 A1 | 7/2014 | Mahaffey et al. | |
| 2014/0229863 A1 | 8/2014 | St. Clair | |
| 2014/0259017 A1 | 9/2014 | Murray et al. | |
| 2014/0351744 A1 | 11/2014 | Jeon et al. | |
| 2015/0081764 A1 | 3/2015 | Zhao et al. | |
| 2015/0127774 A1 | 5/2015 | Hitomi et al. | |
| 2015/0199727 A1* | 7/2015 | Naveh | G06Q 30/0269 |
| | | | 705/14.66 |
| 2015/0348001 A1 | 12/2015 | Van Os et al. | |
| 2015/0370456 A1 | 12/2015 | Kobayashi et al. | |
| 2016/0005038 A1* | 1/2016 | Kamal | G06Q 20/405 |
| | | | 705/44 |
| 2016/0019547 A1* | 1/2016 | Gurnani | G06Q 20/40145 |
| | | | 705/44 |
| 2016/0026253 A1* | 1/2016 | Bradski | G02B 27/225 |
| | | | 345/8 |
| 2016/0063473 A1 | 3/2016 | Lee | |
| 2016/0162270 A1 | 6/2016 | Kumar | |
| 2016/0163052 A1 | 6/2016 | Kim | |
| 2016/0191355 A1 | 6/2016 | Joshi et al. | |
| 2016/0244311 A1 | 8/2016 | Burks et al. | |
| 2016/0292291 A1 | 10/2016 | Yan | |
| 2016/0334966 A1 | 11/2016 | Kim et al. | |
| 2016/0371686 A1* | 12/2016 | Metral | G06Q 20/206 |
| 2017/0127230 A1* | 5/2017 | Enriquez | H04L 67/18 |
| 2017/0164159 A1 | 6/2017 | Mycek et al. | |
| 2017/0278150 A1 | 9/2017 | Tucker | |
| 2017/0357387 A1 | 12/2017 | Clarke | |
| 2018/0063684 A1 | 3/2018 | Cheng et al. | |
| 2018/0165002 A1 | 6/2018 | Yang et al. | |
| 2018/0288564 A1 | 10/2018 | Ellis et al. | |
| 2018/0335903 A1 | 11/2018 | Coffman et al. | |
| 2019/0171441 A1 | 6/2019 | Chatterjee et al. | |
| 2019/0339840 A1 | 11/2019 | Park et al. | |
| 2020/0090157 A1 | 3/2020 | Khan | |
| 2021/0318792 A1 | 10/2021 | Zhang et al. | |
| 2021/0318893 A1 | 10/2021 | Zhang et al. | |

FOREIGN PATENT DOCUMENTS

| | | |
|---|---|---|
| WO | 2013/006654 A2 | 1/2013 |
| WO | 2016/167620 A1 | 10/2016 |
| WO | 2017/027526 A1 | 2/2017 |
| WO | 2019/092435 A1 | 5/2019 |

OTHER PUBLICATIONS

Reference U Continued: Retrieved from https://www.proquest.com/dissertations-theses/location-monitoring-application-using-ibeacon/docview/1771508833/se-2?accountid=14753 (Year: 2015).*
Storehub, "QR Table Ordering and Cashback—Beep Order & Cashback", Available online on: <https://www.youtube.com/watch?v=TCukF45kOU8&ab_channel=StoreHub>, Jul. 25, 2019, 3 pages.
Android Developers, "Android App Bundle", Online available at http://web.archive.org/web/20200303021924/https://developer.android.com/platform/technology/app-bundle, Mar. 3, 2020, 5 pages.
Android Developers, "Deliver features on-demand with dynamic features", Online available at: https://www.youtube.com/watch?v=httqEshs_Bk, May 23, 2018, 3 pages.
Howtoinstall, "How to Download and Install Winamp 5.6 on Windows 2017", Online available at: https://www.youtube.com/watch?v=-6YDT9UkuEg, Oct. 17, 2017, 3 pages.
Applicant-Initiated Interview Summary received for U.S. Appl. No. 17/030,804, dated Feb. 26, 2021, 2 pages.
Applicant-Initiated Interview Summary received for U.S. Appl. No. 17/030,804, dated Jun. 14, 2021, 2 pages.
Applicant-Initiated Interview Summary received for U.S. Appl. No. 17/031,687, dated Mar. 5, 2021, 4 pages.
Applicant-Initiated Interview Summary received for U.S. Appl. No. 17/031,687, dated May 28, 2021, 4 pages.
Corrected Notice of Allowance received for U.S. Appl. No. 17/031,687, dated Aug. 27, 2021, 2 pages.
Corrected Notice of Allowance received for U.S. Appl. No. 17/031,687, dated Jul. 1, 2021, 2 pages.
Corrected Notice of Allowance received for U.S. Appl. No. 17/031,687, dated Jul. 22, 2021, 2 pages.
Corrected Notice of Allowance received for U.S. Appl. No. 17/031,687, dated Sep. 16, 2021, 2 pages.
Final Office Action received for U.S. Appl. No. 17/030,804, dated Apr. 14, 2021, 33 pages.
Final Office Action received for U.S. Appl. No. 17/031,687, dated Mar. 24, 2021, 32 pages.
International Search Report and Written Opinion received for PCT Patent Application No. PCT/US2021/025051, dated Sep. 23, 2021, 21 pages.
Invitation to Pay Additional Fees received for PCT Patent Application No. PCT/US2021/025051, dated Jul. 28, 2021, 17 pages.
Non-Final Office Action received for U.S. Appl. No. 17/030,804, dated Dec. 24, 2020, 31 pages.
Non-Final Office Action received for U.S. Appl. No. 17/031,687, dated Dec. 21, 2020, 28 pages.
Notice of Allowance received for U.S. Appl. No. 17/030,804, dated Jul. 12, 2021, 10 pages.
Notice of Allowance received for U.S. Appl. No. 17/031,687, dated Jun. 21, 2021, 29 pages.
Office Action received for Australian Patent Application No. 2020239747, dated Jul. 29, 2021, 9 pages.
Office Action received for Australian Patent Application No. 2020239759, dated Jun. 3, 2021, 6 pages.
Office Action received for Australian Patent Application No. 2020239759, dated Oct. 12, 2021, 6 pages.
Office Action received for Danish Patent Application No. PA202070633, dated May 6, 2021, 6 pages.
Office Action received for Danish Patent Application No. PA202070634, dated Jun. 4, 2021, 3 pages.
Search Report and Opinion received for Danish Patent Application No. PA202070633, dated Dec. 21, 2020, 10 pages.
Search Report and Opinion received for Danish Patent Application No. PA202070634, dated Jan. 6, 2021, 9 pages.
Supplemental Notice of Allowance received for U.S. Appl. No. 17/030,804, dated Oct. 19, 2021, 2 pages.
Supplemental Notice of Allowance received for U.S. Appl. No. 17/030,804, dated Sep. 1, 2021, 2 pages.

* cited by examiner

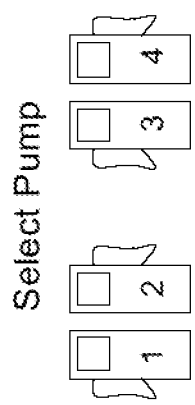
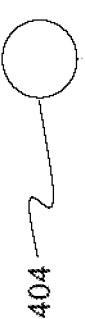
FIG. 4

FIG. 6

Bob's Burger Joint — 602

Menu — 604
Meals >
Burgers & Sandwiches >
Chicken & Fish >
Breakfast >
Salads >
Snacks & Sides >
Beverages >
Desserts & Shakes >

Bob's Burger Joint

Your Order Number: 123

Cheeseburger $2.49

Large Fries $1.50

Thank you for visiting Bob's Burger Joint

METHOD, NON-TRANSITORY COMPUTER-READABLE MEDIUM, AND MOBILE DEVICE FOR LOCATION-BASED GRAPHICAL USER INTERFACES

TECHNICAL FIELD

The disclosure generally relates to presenting location based content on a mobile device.

BACKGROUND

For many people, the mobile device (e.g., smartphone, tablet, smart watch, etc.) is the device they use to manage their schedule, interact with other people, make purchases, and perform other tasks in their daily lives. The modern mobile device provides functionality that replaces many traditional services. For example, modern mobile devices are being configured to function as credit cards, identification, and navigational tools, among other things. This functionality is constantly being extended to make commerce between the users of these mobile devices and store owners (e.g., merchants) easier. For example, instead of using a plastic credit card to make a purchase, a user merely has to present their mobile device at a point of sale terminal in a store to make a purchase. However, often the user is still required to enter the store and interact with the point of sale terminal or customer service person to make purchases at a store location.

SUMMARY

In some implementations, a mobile device can receive identification information for a merchant store location. The mobile device can receive the identification information when the mobile device is proximate to the store location, for example. The mobile device can obtain graphical user interface (GUI) configuration data for the merchant store location based on the store location identification information. For example, the mobile device can obtain GUI content that has been customized for the merchant store location. The mobile device can configure a GUI of an application installed on the mobile device based on the obtained GUI configuration data. The mobile device can make the proximity application accessible to a user of the mobile device when the mobile device is near the store location.

Particular implementations provide at least the following advantages: a virtual storefront for a merchant location can be presented on the mobile device when the mobile device is near the merchant location; the GUI of the proximity application can be dynamically configured for a particular store location based on the mobile device's proximity to the particular store location; the merchant location information can be used by the mobile device to gain access to a merchant access point for accessing a network (e.g., the Internet) when the mobile device does not have access to a cellular data network.

Details of one or more implementations are set forth in the accompanying drawings and the description below. Other features, aspects, and potential advantages will be apparent from the description and drawings, and from the claims.

DESCRIPTION OF DRAWINGS

FIG. 4 illustrates an example graphical user interface for authorizing payment for a purchase.

FIG. 6 illustrates an example location-based graphical user interface for a quick service restaurant merchant type.

FIG. 10 illustrates an example order confirmation graphical user interface.

Like reference symbols in the various drawings indicate like elements.

DETAILED DESCRIPTION

Overview

Figure 1:
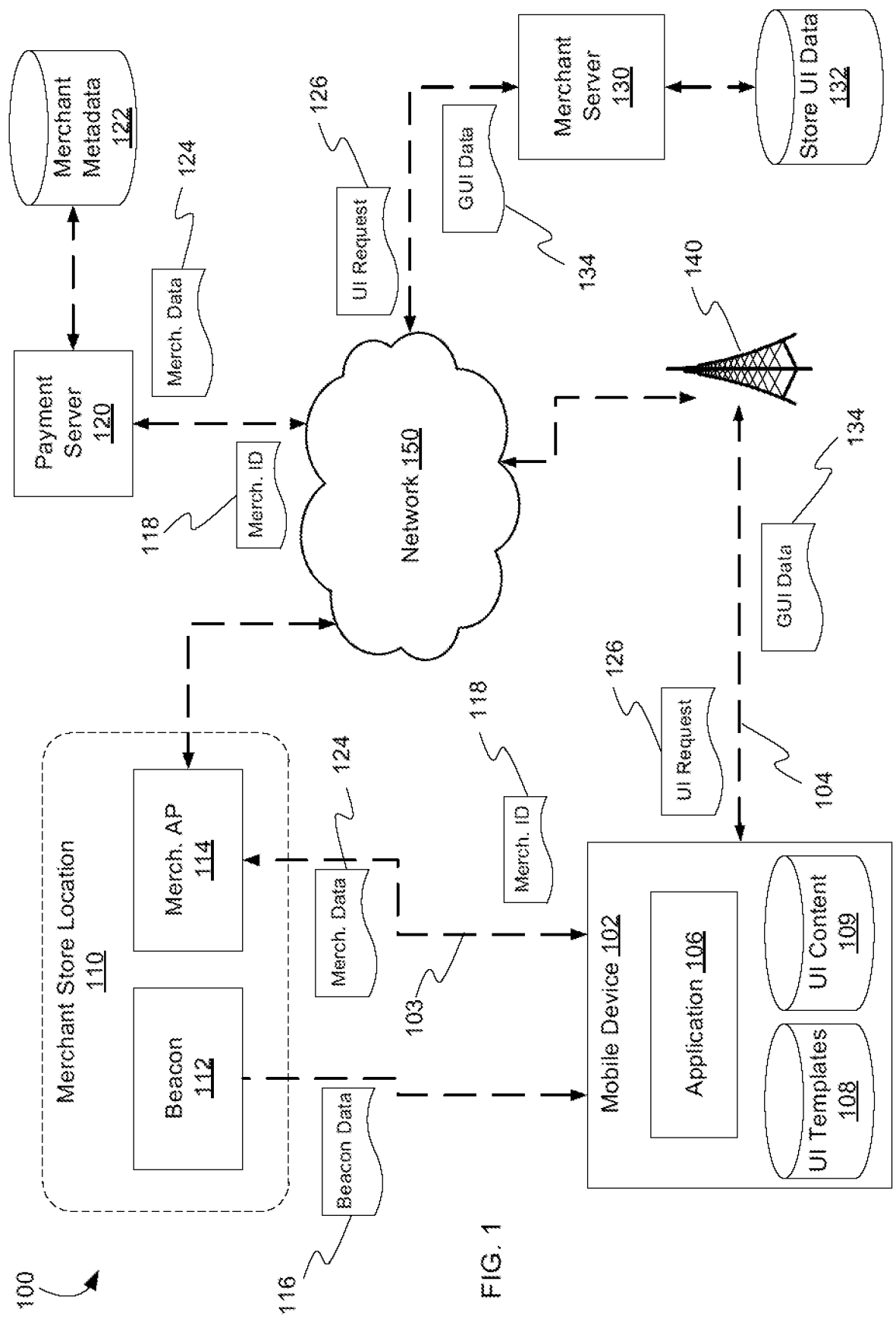
FIG. 1 is a block diagram of an example system for presenting location-based graphical user interfaces.

FIG. 1 is a block diagram of an example system 100 for presenting location-based graphical user interfaces (GUIs). In some implementations, system 100 can include mobile device 102. For example, mobile device 102 can be a smartphone, tablet computer, smartwatch, smart-glasses, or other wearable device.

In some implementations, mobile device 102 can include application 106. For example, application 106 can be a standalone application installed on mobile device 102. Application 106 can be an application, function, utility, etc., built into or part of the operating system of mobile device 102.

In some implementations, mobile device 102 can allow access to application 106 in response to determining that mobile device 102 is proximate to a merchant location. For example, mobile device 102 can determine or detect that mobile device 102 is near a merchant store location 110 (e.g., store, restaurant, gas station, etc.) when mobile device 102 receives a signal from merchant store location 110 (e.g., mobile device 102 is within broadcast range of merchant store location 110). Mobile device 102 can determine or detect that mobile device 102 is near merchant store location 110 (e.g., store, restaurant, gas station, etc.) when mobile device 102 receives global navigational satellite system (GNSS) signals indicating that mobile device 102 is near merchant store location 110. In response to determining that mobile device 102 is near merchant store location 110, mobile device 102 can present a graphical object that a user of mobile device 102 can select to invoke application 106.

In some implementations, application 106 can be configured to present graphical user interfaces according to predefined graphical user interface templates. For example, application 106 can be configured with different GUI templates corresponding to different categories or types of businesses. The GUI templates can define the layout of various user interface elements and interactions between user interface elements that allow the user to browse items for purchase, select items for purchase, and initiate the purchase of the selected items.

In some implementations, user interface (UI) template database 108 can store various GUI templates that define how graphical user interfaces presented by application 106 should look for each type of business. For example, UI template database 108 can include a quick service restaurant GUI template that defines the layout of various graphical elements (e.g., images, food menus, prices, etc.) needed for customers to make food item selections and purchases. UI template database 108 can include a gas station GUI template that defines the layout of various graphical elements (e.g., images, fuel pump menus, prices, etc.) needed for customers to purchase fuel at gas station locations.

In some implementations, the GUI templates stored in UI template database 108 and used by application 106 can define a generic layout or structure of a graphical user interface but do not include content. For example, the content can be dynamically provided (e.g., as needed when mobile device 102 arrives at a merchant location) by the merchants who run or manage the merchant locations (e.g., merchant store location 110). For example, a merchant server can send GUI data for merchant store location 110 that includes images, menu items, prices, descriptions of goods sold, etc., to application 106 on mobile device 102. Application 106 can populate a GUI template with the merchant GUI data to generate and present a GUI on mobile device 102 that is specific to merchant store location 110.

The System

In some implementations, mobile device 102 can receive merchant beacon data 116 from beacon 112 at merchant store location 110. For example, a user of mobile device 102 can visit merchant store location 110 (e.g., a restaurant, gas station, coffee shop, etc.) with mobile device 102. When mobile device 110 is moved near merchant store location 110, mobile device 102 can receive beacon data 116 from beacon 112. For example, beacon 112 can be a short range wireless beacon (e.g., Bluetooth, Bluetooth low energy, near field communication, etc.). Beacon 112 can be configured to transmit beacon data 116. For example, beacon data 116 can include a merchant Wi-Fi access point identifier (SSID), a merchant identifier (universally unique identifier "UUID"), and/or a merchant store identifier (e.g. for a particular store location). Beacon 112 can be located at merchant store location 110 (e.g., merchant store location). Thus, when mobile device 102 moves within range of beacon 112, mobile device 102 can receive beacon data 116. In some implementations, in response to receiving beacon data 116, mobile device 102 can invoke application 106. For example, application 106 can operate on mobile device 102 to obtain merchant-specific GUI content data from payment server 120 and/or merchant server 130, as described further below.

In some implementations, mobile device 102 can determine that a merchant store location is authorized to present a GUI using application 106 based on beacon data 116. For example, mobile device 102 can send merchant identification data 118 (e.g., merchant identifier and/or store identifier received in beacon data 116) to payment server 120 through network 150 (e.g., a local area network, wide area network, the Internet, etc.) to determine whether merchant store location 110 is authorized to present a GUI using application 106.

In some implementations, mobile device 102 can connect to network 150 using a cellular data connection through a cellular data network represented by cellular tower 140. In some cases, however, mobile device 102 may not have access to cellular tower 140. Thus, in some implementations, mobile device 102 can connect to network 150 through merchant access point 114 at merchant store location 110. For example, mobile device 102 can connect to merchant access point 114 (e.g., Wi-Fi access point) based on the Wi-Fi identifier received in beacon data 116. For example, mobile device 102 can find and connect to merchant access point 114 using the Wi-Fi identifier received in beacon data 116.

While FIG. 1 shows mobile device 102 transmitting some data (e.g., merchant identification data 118, merchant metadata 124) over Wi-Fi connection 103 through merchant access point 114 and transmitting other data (e.g., user interface data request 126, user interface data 134) over cellular data connection 104 through cellular tower 140, mobile device 102 can transmit the data represented in FIG. 1 through network 150 using Wi-Fi connection 103 and/or cellular data connection 104 based on whichever connection mechanism is available to mobile device 120 at the time. Thus, in some instances, mobile device 102 can transmit all data through merchant access point 114. In some instances, mobile device 102 can transmit all data through cellular tower 140. In some instances, mobile device 102 can use both merchant access point 114 and cellular tower 140 to transmit data through network 150. FIG. 1 should not be interpreted to require that specific data must be sent through merchant access point 114 or specific data must be sent through cellular tower 140. Any connection between mobile device 102 and network 150 can be used to transmit the data depicted in FIG. 1.

In some implementations, payment server 120 can determine whether a merchant is authorized to present a GUI on mobile device 102. For example, a merchant (e.g., business) can register with payment server 120 for inclusion in a collection of authorized merchants that can provide GUI content data for presentation on a GUI of application 106. When the merchant registers with payment server 120, payment server 120 can generate a merchant identifier (e.g., a universally unique identifier "UUID") for the merchant. The merchant can use the UUID to provide to payment server 120 merchant metadata, including an image (e.g., icon) representing a merchant and a server address (e.g., uniform resource locator "URL") for retrieving merchant GUI content data. For example, the server address can correspond to a merchant server (e.g., merchant server 130) that is configured to serve merchant-specific or merchant store-specific GUI content data for populating a corresponding GUI template of application 106. Upon receipt of the merchant metadata, payment server 120 can store the merchant metadata (e.g., representative image, merchant URL, etc.) in merchant metadata database 122 in association with the merchant identifier, for example.

When payment server 120 receives merchant identification data 118 (e.g., merchant identifier, merchant store identifier, etc.) from mobile device 102, payment server 120 can determine whether the merchant is authorized to present a GUI on mobile device 102 by determining whether the merchant identifier in merchant identification data 118 exists in merchant metadata database 122. If the received merchant identifier exists in merchant metadata database 122, then payment server 120 can determine that the merchant corresponding to the merchant identifier is an authorized merchant. After payment server 120 determines that the merchant identifier exists in merchant metadata database 122, payment server 120 can obtain the merchant metadata (e.g., merchant identifier, representative image, URL, etc.) corresponding to the merchant identifier and transmit the merchant metadata (e.g., merchant metadata 124) to mobile device 102 through network 150.

In some implementations, upon receipt of merchant metadata 124, mobile device 102 can present the representative image for merchant store location 110 on a GUI of mobile device 102. For example, mobile device 102 can receive merchant metadata 124 from payment server 120. Merchant metadata 124 can include a representative image (e.g., icon) for merchant store location 110. For example, the representative image can be presented on a locked screen GUI of mobile device 102 so that the user of mobile device 102 can invoke application 106 on mobile device 102. The representative image can be presented on an unlocked GUI of mobile device 102 so that the user can invoke application 106 while mobile device 102 is unlocked and proximate to merchant store location 110.

In some implementations, mobile device 102 can obtain GUI content data for merchant store location 110 based on merchant metadata 124. As described above, merchant metadata 124 can include a merchant identifier and/or URL corresponding to merchant server 130. Mobile device 102 can generate a UI request 126 for obtaining GUI content data for merchant store location 110. UI request 126 can include the store identifier for merchant store location 110 received in beacon data 116, for example. Mobile device 102 can send UI request 126 to merchant server 130 through network 150 based on the URL received in merchant metadata 124. For example, mobile device 102 can send UI request 126 upon receipt of merchant metadata 124. Mobile device 102 can send UI request 126 in response to receiving user input invoking application 106.

In some implementations, mobile device can request GUI content data using the URL included in merchant metadata 124. For example, the URL can identify the location of merchant server 130 on the network and/or a mechanism for retrieving GUI content data for application 106. Mobile device 102 can use the URL to send UI request 126 to merchant server 130 to obtain the GUI content data for merchant store location 110 from merchant server 130, for example.

In some implementations, merchant server 130 can send GUI content data 134 to mobile device 102. For example, upon receiving UI request 126 from mobile device 102, merchant server 130 can use the store identifier included in UI request 126 to determine GUI content data for merchant store location 110. For example, a merchant (e.g., fast food business, oil company, clothing retailer, etc.) may operate many store locations as part of its business. Each store locations may have different characteristics, appearances, or merchandise based on the location of the store. For example, a fast food business store location in California may have different menu items than a store location in France. The merchant can generate different GUI content data for each store location and store the GUI content data in store UI database 132. For example, store UI database can include a mapping between store identifiers and GUI content data for respective store identifiers.

When merchant server 130 receives UI request 126 that includes a store identifier, merchant server 130 can obtain the GUI content data corresponding to the store identifier from store UI database 132. For example, the GUI content data can include a GUI template identifier corresponding to a template in UI template database 108. The GUI content data can include images, graphical objects, price information, menu information, product descriptions, color schemes, and/or other data needed for application 106 to populate the identified template with content for presentation on a display of mobile device 102. For example, each proximity application GUI template can be described using an XML schema. The GUI content data obtained by merchant server 130 and stored in store UI database 132 can be an XML document that includes data corresponding to the document objects described by the XML schema. In some implementations, after merchant server 130 obtains the GUI content data, merchant server 130 can transmit the obtained GUI content data (e.g., GUI data 134) to mobile device 102 through network 150.

In some implementations, mobile device 102 can receive GUI data 134 (e.g., GUI content data) from merchant server 130. When invoked, application 106 can generate a GUI for presentation on a display of mobile device 102 based on the GUI content data received in GUI data 134. For example, based on the template identifier in the received GUI content data, application 106 can determine which GUI template should be used for presenting a GUI for merchant store location 110. Application 106 can obtain the GUI template corresponding to the template identifier from UI template database 108. After the UI template is obtained by application 106, application 106 can generate the GUI for merchant store location 110 by populating the UI template with the GUI content data received in GUI data 134. After application 106 generates the GUI for merchant store location 110, application 106 can present the GUI for merchant store location 110 on the display of mobile device 102.

In some implementations, application 106 can use locally stored GUI content data to generate a GUI for merchant store location 110. For example, upon receipt of GUI data 134, mobile device 102 can store the GUI content data included in GUI data 134 in UI content database 109. UI content database 109 can store a mapping that maps or associates the merchant identifier, merchant store identifier, and GUI content data for merchant store location 110, for example. When mobile device 102 receives beacon data 116 for merchant store location 110, mobile device 102 can invoke application 106 and provide application 106 with the merchant identifier and store identifier received in beacon data 116. Application 106 can compare the merchant identifier and/or store identifier to the data in UI content database 109 to determine whether GUI content data for merchant store location 110 exists locally on mobile device 102. When the GUI content data for merchant store location 110 exists in local UI content database 109 on mobile device 102, application 106 can generate a GUI for merchant store location 110 based on the locally stored GUI content data. When the GUI content data for merchant store location 110 does not exist in local UI content database 109 on mobile device 102, application 106 can obtain GUI content data for merchant store location 110 by sending data requests to payment server 120 and merchant server 130 as described above.

Figure 2:
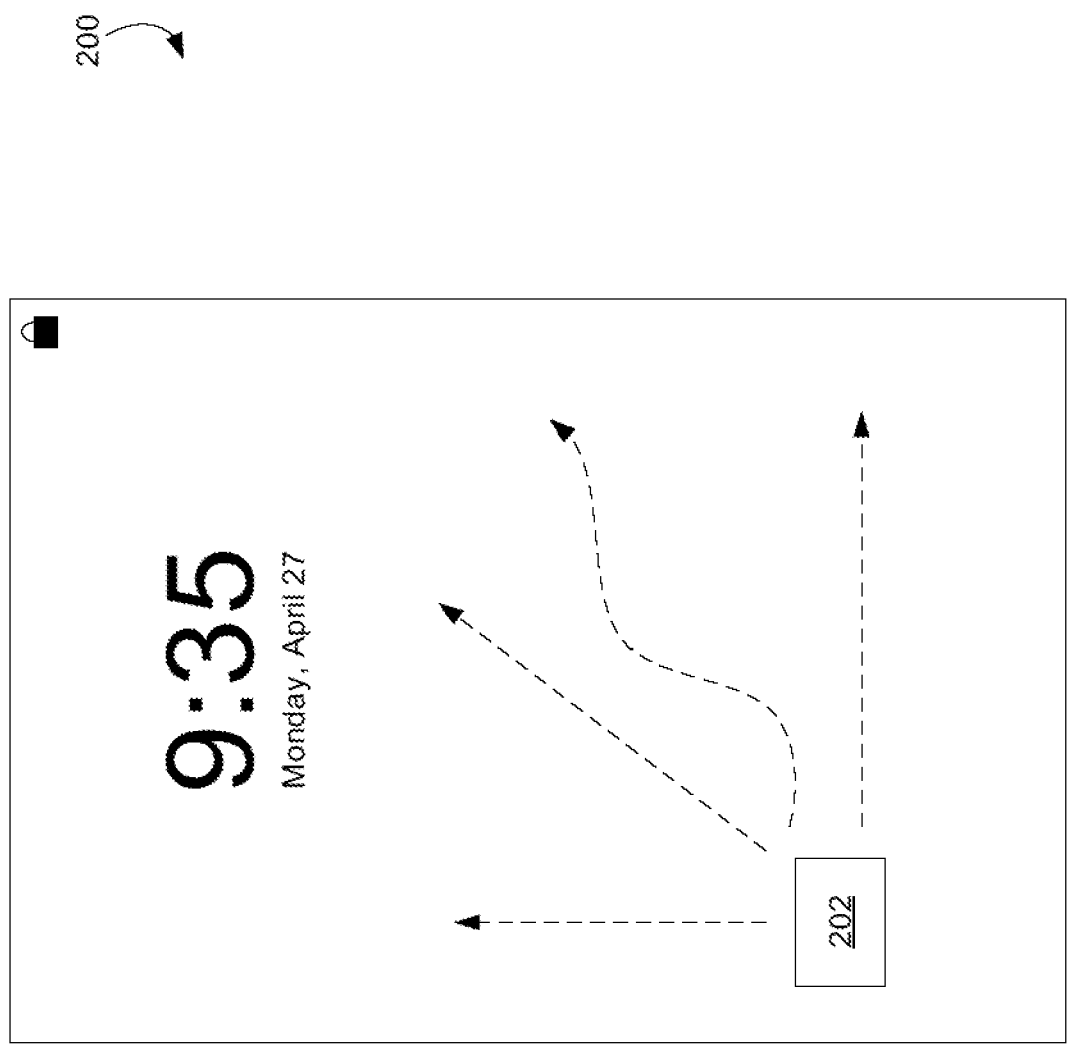
FIG. 2 illustrates an example graphical user interface for invoking a location based graphical user interface.

FIG. 2 illustrates an example graphical user interface 200 for invoking a location based graphical user interface. For example, the location-based graphical user interface can be a graphical user interface of application 106 displayed on mobile device 102. In some implementations, GUI 200 can be a lock screen presented on a display of mobile device 102. For example, the lock screen can be presented on mobile device 102 when mobile device 102 is locked. When mobile device 102 is locked, mobile device 102 can restrict a user's access to features or applications installed on mobile device 102 until the user enters a passcode, password, or some other authorized user authentication credentials. In some implementations, GUI 200 can be presented after mobile device 102 has been unlocked by a user.

In some implementations, GUI 200 can include graphical element 202. For example, graphical element 202 can be an image, icon, or other graphical object for invoking application 106. Graphical element 202 can present the merchant representative image (e.g., icon) received by mobile device 102 from payment server 120 in merchant metadata 124, as described above. For example, in response to determining that mobile device 102 is proximate to (e.g., near) an authorized merchant store location (e.g., merchant store location 110), mobile device 102 can (e.g., immediately, or almost immediately) present graphical element 202 on GUI 200 so that the user can invoke application 106.

In some implementations, mobile device 102 can invoke application 106 upon detecting user input with respect to graphical element 202. For example, a user can provide input (e.g., touch input) to graphical element 202 by touching or tapping graphical element 202. A user can provide input to graphical element 202 by sliding or dragging graphical element 202 across GUI 200. For example, the user can slide graphical element 202 horizontally, vertically, diagonally, or in any other direction or multiple directions (e.g., a wavy or meandering path) across GUI 200 to invoke application 106. When invoked, application 106 can present a GUI specific to the merchant store location based on the GUI content data received from merchant server 130, as described above.

In some implementations, application 106 can be invoked from the locked screen without unlocking mobile device 102. For example, when graphical element 202 is presented on the locked screen of locked mobile device 102, a user can select graphical element 202 and invoke application 106 without entering the user's credentials to unlock mobile device 102.

In some implementations, graphical element 202 can be presented on GUI 200 in response to receiving merchant metadata 124 from payment server 120. For example, mobile device 102 can present graphical element 202 as soon as the merchant representative image is received from payment server 120. In some implementations, mobile device 102 can present graphical element 202 on GUI 200 in response to receiving GUI content data (e.g., GUI data 134) from merchant server 130.

In some implementations, mobile device 102 can present graphical element 202 on GUI 200 in response to receiving beacon data 116. For example, in response to receiving beacon data 116, mobile device 102 can obtain merchant metadata and/or merchant GUI content data from UI content database 109, including the merchant representative image to be displayed on GUI 200. After the merchant representative image is obtained, mobile device 102 can present graphical element 202 on GUI 200 using the merchant obtained image.

Figure 3:
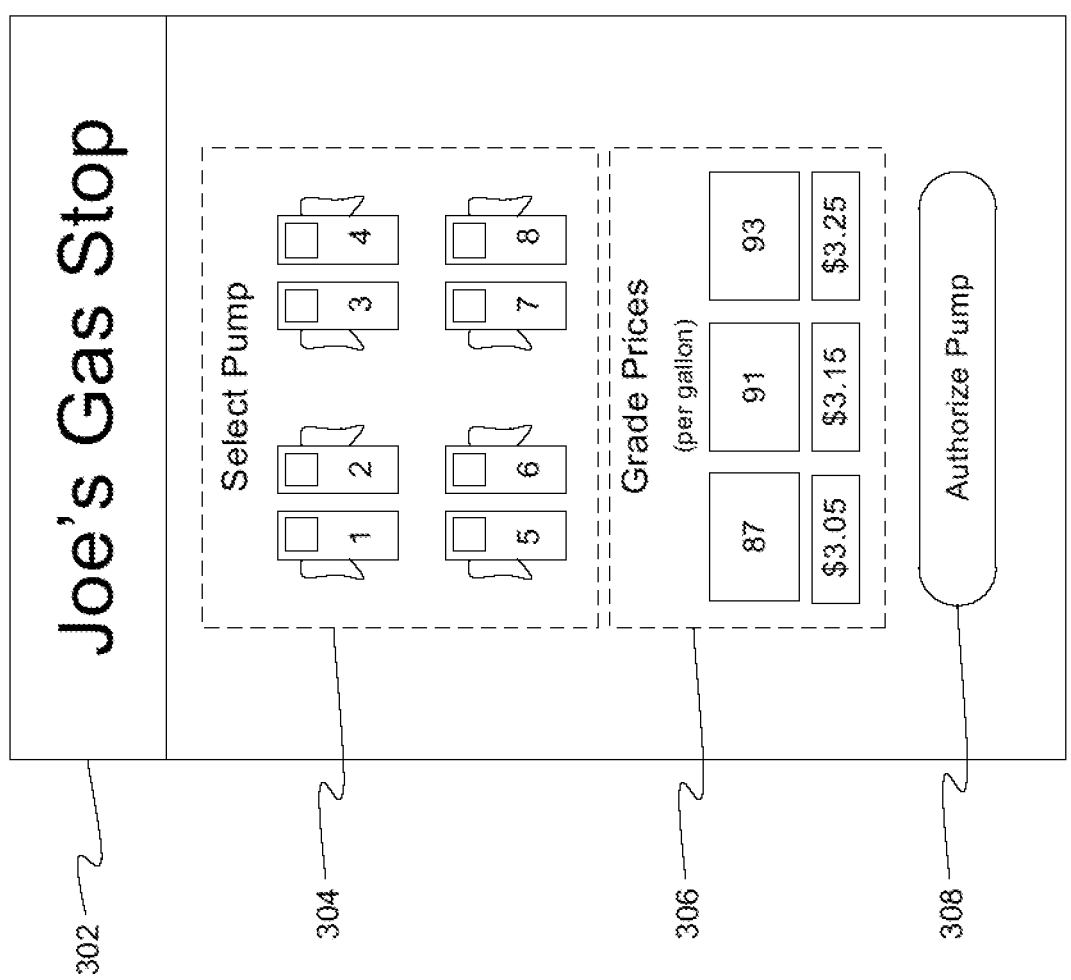
FIG. 3 illustrates an example location-based graphical user interface for a gas station merchant type.

FIG. 3 illustrates an example location-based graphical user interface 300 for a gas station merchant type. For example, GUI 300 can be a templatized graphical user interface of application 106. For example, when application 106 receives GUI content data for merchant store location 110 from merchant server 130, the GUI content data can specify a GUI template type (e.g., gas station, quick service restaurant, department store, etc.) and content for populating the GUI template. The template type for GUI 300 can be "gas station" or "service station," for example. When application 106 receives the GUI content data, application 106 can obtain the "gas station" GUI template from UI template database 108.

In some implementations, a GUI template can specify the type of data to be displayed on GUI 300 and the layout of the data on GUI 300. For example, the GUI template can include placeholders for GUI content data to be obtained from various merchants that can be used to customize GUI 300 for individual merchants and/or merchant store locations. For example, the "gas station" GUI template can include information describing the location of header area 302 on GUI 300 and the type of data (e.g., an image, text, background color, etc.) to be presented in header area 302. The "gas station" GUI template can include information describing the location of gas pump menu 304 and the type of data (e.g., images, pump identifiers, etc.) to be displayed in gas pump menu 304. The "gas station" GUI template can include information describing the location of gas grade menu 306 and the type of data (e.g., images, grade identifiers, prices, etc.) to be displayed in gas grade menu 306. The "gas station" GUI template can include information describing the location of graphical element 308 (e.g., a button) for pre-authorizing a charge against the user's credit card or other payment account.

When application 106 obtains GUI content data for merchant store location 110, application 106 can display the GUI content data according to the information (e.g. layout, location, data types) described in the corresponding GUI template. For example, if merchant store location 110 corresponds to a gas station, application 106 can receive GUI content data for the "gas station" template from merchant server 130 corresponding to merchant store location 110. The GUI content data can include a merchant-specific image (e.g., a merchant logo, trademark, or other identifying image) for display in header area 302. The GUI content data can include merchant location-specific gas pump information (e.g., number of pumps, images representing the pumps, etc.) for presenting gas pump menu 304. The GUI content data can include merchant location-specific gas grade information (e.g., gas grades, prices, etc.) for presenting gas grade menu 306. Thus, when application 106 displays GUI 300, application 106 can present the merchant location-specific GUI content data on GUI 300 according to layout (e.g., graphical element locations) specified by the "gas station" GUI template.

In some implementations, application 106 can receive user input to GUI 300 indicative of the user's desire to make a purchase from merchant store location 110. For example, a user can interact with GUI 300 to purchase fuel from a gas station corresponding to merchant location 110. Application 106 can receive user input selecting a gas pump from gas pump menu 304, selecting a grade of gas from gas grade menu 306, and selecting graphical element 308 authorizing the merchant to charge the user's credit card or other payment account for the purchase of the selected grade of gas from the selected gas pump.

FIG. 4 illustrates an example graphical user interface 400 for authorizing payment for a purchase. For example, a user can provide input to GUI 400 to authorize payment for a fuel purchase initiated through GUI 300 of FIG. 3. In some implementations, GUI 400 can present graphical element 402 for presenting purchase information. For example, graphical element 402 can be an (e.g., opaque, semitransparent, etc.) overlay that is presented on top of GUI 300 on a display of computing device 102.

In some implementations, graphical element 402 can present textual information describing a purchase initiated by a user of application 106 on mobile device 102. For example, graphical element 402 can include a description of the user's payment account (e.g., credit card information, bank account information, payment processing service account, etc.). Graphical element 402 can include a description of the user's contact information (e.g., email address, telephone number, home address, user's name, etc.). Graphical element 402 can include a description of the charges to be applied to the user's payment account.

In some implementations, graphical element 402 can include graphical element 404 to prompt the user to pay using a touch identification feature of mobile device 102. For example, mobile device 102 can be configured with a fingerprint sensor (e.g., camera, scanner, etc.) that can capture an image of the user's fingerprint. To make a payment, the user can touch a finger to the fingerprint sensor. Mobile device 102 can capture the fingerprint of the finger, compare the captured fingerprint to a stored or previously captured and authenticated fingerprint of an authorized user of mobile device 102, proximity application 105, and/or payment server 120. If the captured fingerprint matches the fingerprint of an authorized user, the purchase can be processed using the identified payment account. In the case of the gas station example above, the gas station merchant can turn on the selected gas pump so the user can pump fuel into his or her vehicle once the gas purchase has been authorized.

Figure 5:
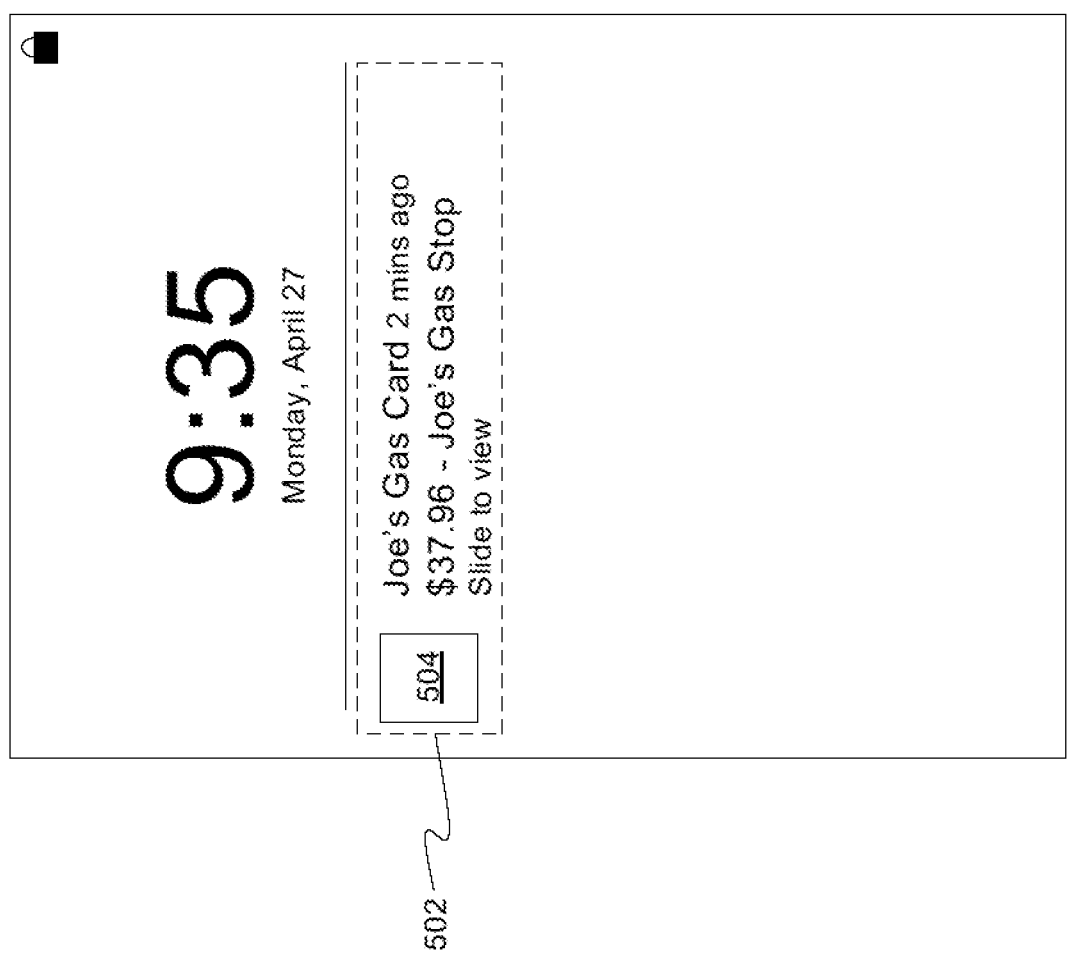
FIG. 5 illustrates an example graphical user interface for confirming a purchase.

FIG. 5 illustrates an example graphical user interface 500 for confirming a purchase. For example, GUI 500 can be presented by mobile device 102. In some implementations, mobile device 102 can receive a notification from a payment system (e.g., payment server 120) when a purchase conducted using application 106 has been processed. For example, after the user finishes pumping gas at the gas station, the gas station merchant can charge the user's payment account for the cost of the fuel received by the user. Since, in the gas station scenario, the user has pre-authorized the charge before pumping the gas (e.g., before knowing the actual cost), the notification serves to inform the user of the actual amount charged against the user's payment account.

In some implementations, the notification information can be presented on GUI 500 using notification graphical element 502. Graphical element 502 can include a description of the payment account, the amount charged, the merchant who charged the payment account, and when the charge was made. In some implementations, graphical element 502 can include graphical element 504 (e.g., an image, an icon) representing the payment account. For example, the user of mobile device 102 can select and/or slide graphical element 504 across GUI 500 to view more information about the charge corresponding to the notification presented on GUI 500.

FIG. 6 illustrates an example location-based graphical user interface 600 for a quick service restaurant merchant type. For example, GUI 600 can be a templatized graphical user interface of application 106. For example, when application 106 receives GUI content data for merchant store location 110 from merchant server 130, the GUI content data can specify a GUI template type (e.g., gas station, quick service restaurant, department store, etc.) and content for populating the GUI template. The template type for GUI 600 can be "quick service restaurant" or "fast food restaurant," for example. When application 106 receives the GUI content data, application 106 can obtain the "quick service restaurant" ("QSR") GUI template from UI template database 108 based on the template identifier in the GUI content data.

In some implementations, a GUI template can specify the type of data to be displayed on GUI 600 and the layout of the data on GUI 600. For example, the GUI template can include placeholders for GUI content data to be obtained from various (e.g., "QSR") merchants that can be used to customize GUI 600 for individual merchants and/or merchant store locations. For example, the "QSR" GUI template can include information describing the location of header area 602 on GUI 600 and the type of data (e.g., an image, text, background color, etc.) to be presented in header area 602. The "QSR" GUI template can include information describing the location of food menu 604 and the type of data (e.g., images, food descriptions, food categories, etc.) to be displayed in food menu 604. The "QSR" GUI template can include information describing the layout of submenus to be displayed upon the selection of a menu item in food menu 604, for example.

When application 106 obtains GUI content data for merchant store location 110, application 106 can display the GUI content data according to the information (e.g. layout, location, data types) described in the corresponding GUI template. For example, if merchant store location 110 corresponds to a quick service restaurant, application 106 can receive GUI content data for the "QSR" template from merchant server 130 corresponding to merchant store location 110. The GUI content data can include a merchant-specific image (e.g., a merchant logo, trademark, or other identifying image) for display in header area 602. The GUI content data can include merchant location-specific food menu information (e.g., images, food descriptions, food categories, etc.) for presenting food menu 604. The GUI content data can include merchant location-specific submenu information describing food items to be displayed in submenus upon receiving a selection of an item from food menu 604. For example, upon selection of an item from food menu 604, application 106 can present a submenu on GUI 700 of FIG. 7.

Figure 7:
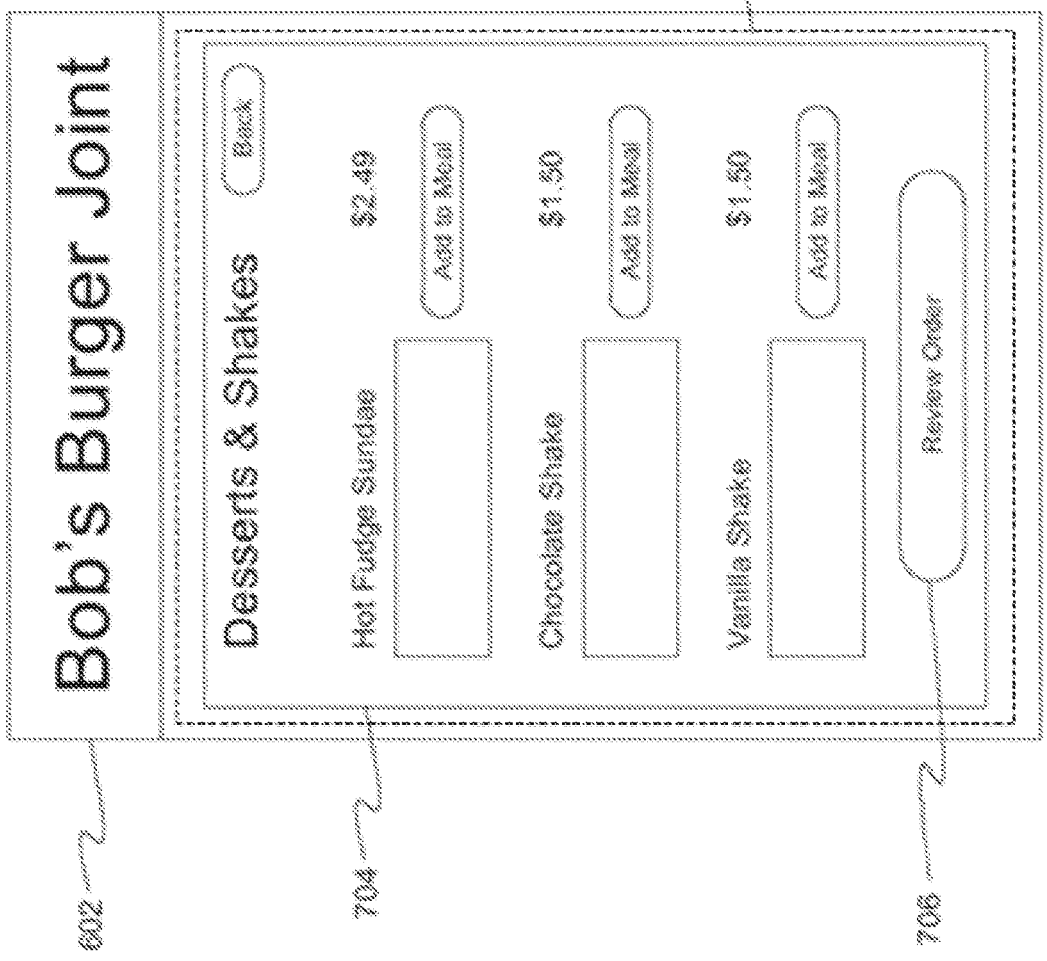
FIG. 7 illustrates an example location-based graphical user interface for a quick service restaurant merchant type.

FIG. 7 illustrates an example location-based graphical user interface 700 for a quick service restaurant merchant type. For example, GUI 700 can correspond to GUI 600. GUI 700 can, for example, include graphical element 702 for presenting a submenu of food menu 604. For example, the "QSR" GUI template can include information describing the layout of submenus (e.g., submenu 704) to be displayed upon the selection of a menu item (e.g. food category) in food menu 604, for example. The "QSR" GUI template can include information describing the location of food submenu 704 and the type of data (e.g., images, food descriptions, food categories, prices, etc.) to be displayed in food submenu 704. The "QSR" GUI template can include information describing the location and configurable attributes (e.g., background color, text color, size, text data, etc.) of other interactive items, such as graphical element 706.

When application 106 obtains GUI content data for merchant store location 110, application 106 can display the GUI content data according to the information (e.g. layout, location, data types) described in the corresponding GUI template. For example, if merchant store location 110 corresponds to a quick service restaurant, application 106 can receive GUI content data for the "QSR" template from merchant server 130 corresponding to merchant store location 110. The GUI content data can include a merchant-specific image (e.g., a merchant logo, trademark, or other identifying image) for display in header area 602. The GUI content data can include merchant location-specific food menu information (e.g., images of food items, food descriptions, food categories, etc.) for presenting food submenu 704. The GUI content data can include merchant location-specific color schemes and text for other interactive items, such as graphical element 706 (e.g., a button). For example, after a user selects food items from menu 604 and submenu 704, the user can select graphical element 706 to view a summary of the selected food items before purchasing the food items.

Figure 8:
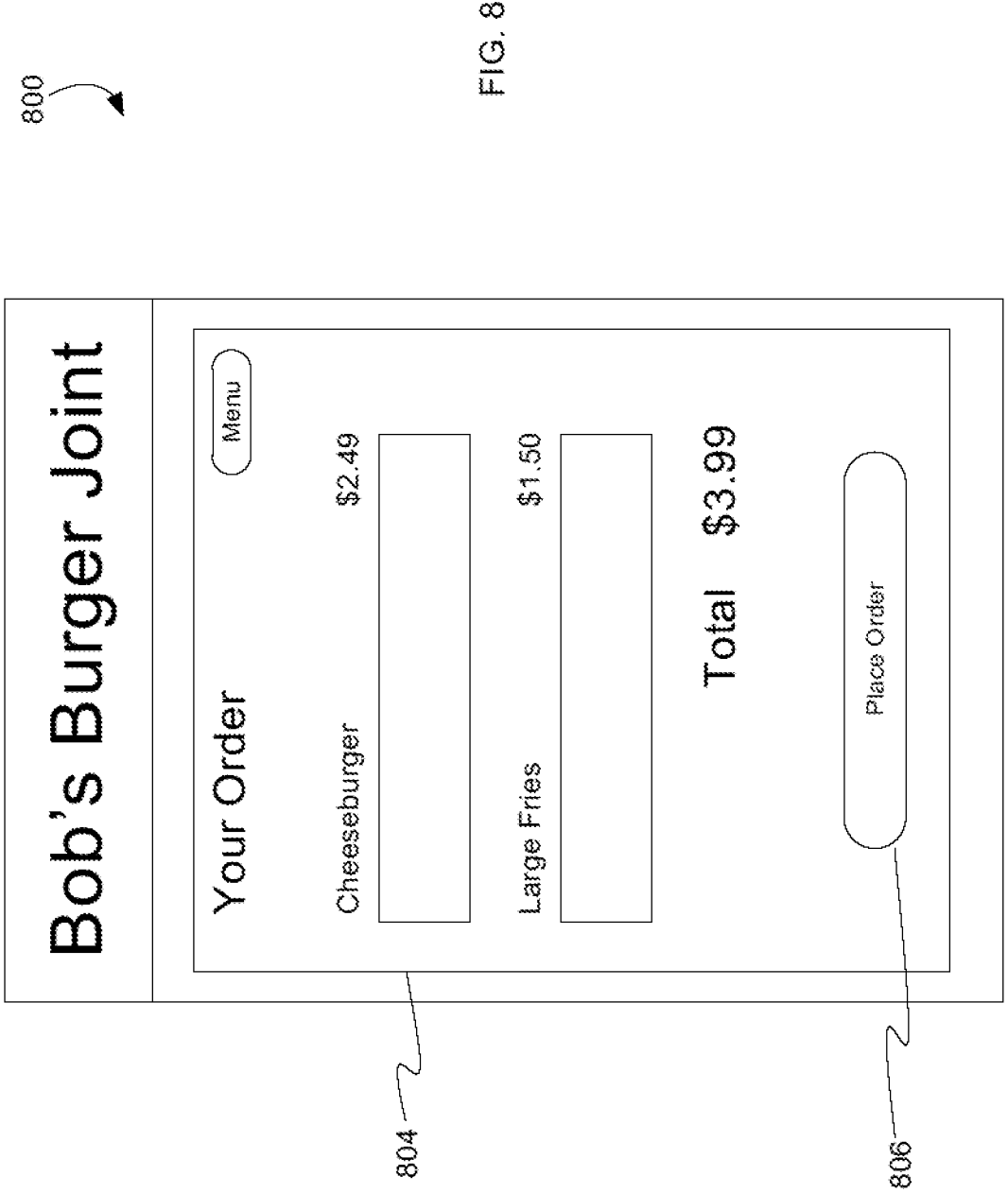
FIG. 8 illustrates an example location-based graphical user interface for a quick service restaurant merchant type.

FIG. 8 illustrates an example location-based graphical user interface 800 for a quick service restaurant merchant type. For example, GUI 800 can be presented in response to a user selecting graphical element 706 of FIG. 7. GUI 800 can be a template based GUI where a merchant provides content to customize a GUI template of application 106, as described above. In some implementations, GUI 800 can present a graphical element 804 describing a summary of a user's order at a quick service restaurant. Graphical element 804 can present descriptions (text, images, prices, etc.) of selected food items. In some implementations, GUI 800 can present graphical element 806 that when selected by a user initiates payment for the selected food items.

Figure 9:
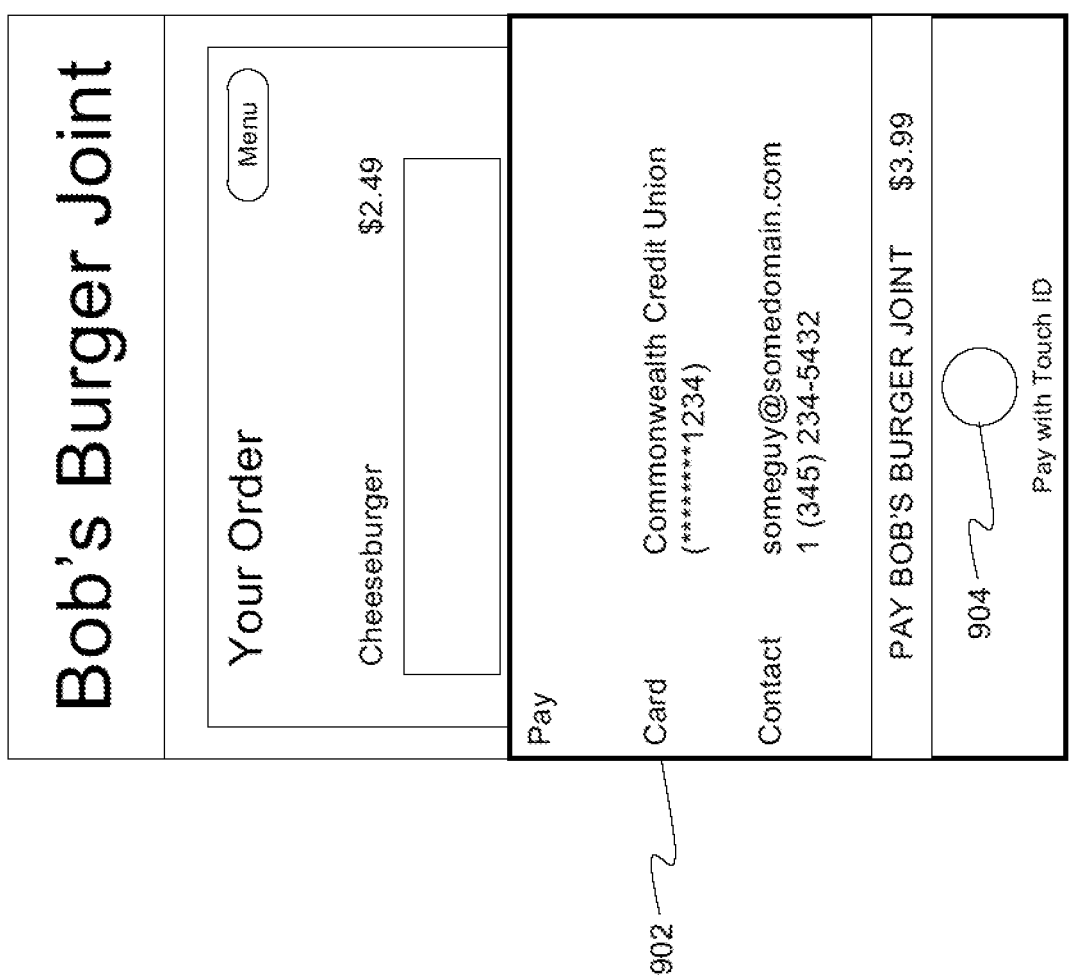
FIG. 9 illustrates an example graphical user interface for authorizing payment for a purchase.

FIG. 9 illustrates an example graphical user interface 900 for authorizing payment for a purchase. For example, GUI 900 can be presented in response to a user selecting graphical element 804 of FIG. 8. For example, a user can provide input to GUI 900 to authorize payment for a food purchase initiated through GUI 800 of FIG. 8. In some implementations, GUI 900 can present graphical element 902 for presenting purchase information. For example, graphical element 902 can be an (e.g., opaque, semitransparent, etc.) overlay that is presented on top of GUI 800 on a display of computing device 102.

In some implementations, graphical element 902 can present textual information describing a purchase initiated by a user of application 106 on mobile device 102. For example, graphical element 902 can include a description of the user's payment account (e.g., credit card information, bank account information, payment processing service account, etc.). Graphical element 902 can include a description of the user's contact information (e.g., email address, telephone number, home address, user's name, etc.). Graphical element 902 can include a description of the charges to be applied to the user's payment account.

In some implementations, graphical element 902 can include graphical element 904 to prompt the user to authorize payment using a touch identification feature of mobile device 102. For example, mobile device 102 can be configured with a fingerprint sensor (e.g., camera, scanner, etc.) that can capture an image of the user's fingerprint. To make a payment, the user can touch a finger to the fingerprint sensor. Mobile device 102 can capture the fingerprint of the finger, compare the captured fingerprint to a stored or previously captured and authenticated fingerprint of an authorized user of mobile device 102, proximity application 105, and/or payment server 120. If the captured fingerprint matches the fingerprint of an authorized user, the purchase can be processed using the identified payment account. In some implementations, mobile device 102 can detect other user input for authorizing payment. For example, GUI 900 can present graphical elements (e.g., text input box, virtual keyboard, etc.) that allow the user to input authentication credentials (e.g., account identifier, user name, password, etc.). GUI 900 can present a graphical element (e.g., a button) that when selected by the user initiates payment for the selected items to be purchased.

In the case of the quick service restaurant example above, the restaurant merchant can begin to prepare the user's food order after the user has authorized payment using graphical element 902. For example, merchant store location 110 can receive a message from mobile device 102, payment server 120, and/or merchant server 130 indicating that a food purchase has been made and identifying the food items purchased. For example, the message can include an order number and a description of the items purchased.

FIG. 10 illustrates an example order confirmation graphical user interface 1000. For example, GUI 1000 can be a templatized GUI presented by application 106 after a user authorizes payment by providing input to GUI 900 or after the user authorizes payment by providing the appropriate touch identification input. For example, when mobile device 102 receives input authorizing payment for the user selected food items, mobile device 102 can send a payment authorization message to merchant server 130. Merchant server 130 can respond by sending a confirmation message to mobile device 102 identifying an order confirmation GUI template for the GUI 1000, content (e.g., images, text, etc., describing the order) for populating the GUI template, and the identification number (e.g., order number) for the food purchase. Application 106 can generate GUI 1000 based on the GUI template, content, and purchase identification number and present GUI 1000 on a display of mobile device 102. For example, when the user arrives at a food pickup window at merchant store location 110, the user can present the order number to the merchant (e.g., restaurant workers) to obtain the purchased items.

Figure 11:
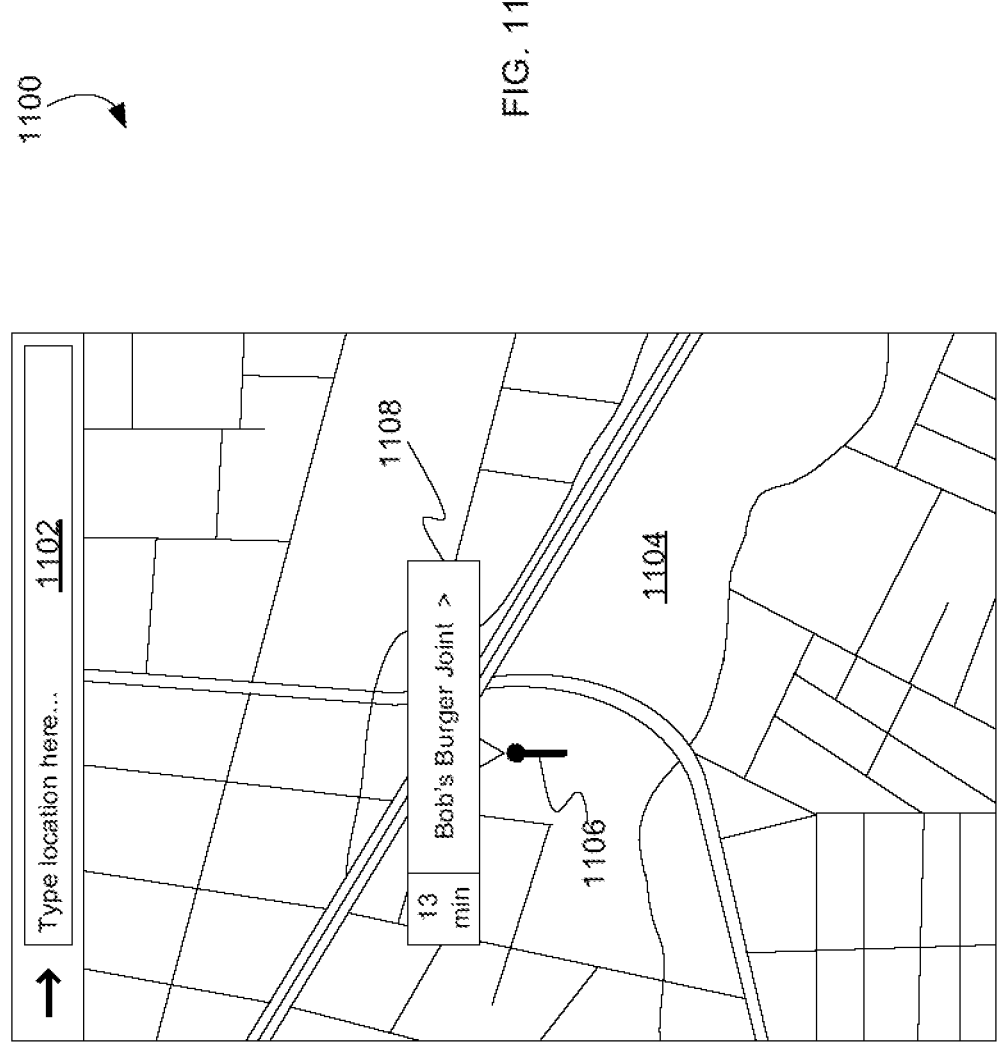
FIG. 11 illustrates an example graphical user interface for invoking a location-based graphical user interface.

FIG. 11 illustrates an example graphical user interface 1100 for invoking a location-based graphical user interface. For example, mobile device 102 can include a maps application or navigation application that presents GUI 1100 on a display of mobile device 102. GUI 1100 can include graphical element 1102 (e.g., a text box) that accepts user input specifying search parameters. For example, the user can input names of places (e.g., the name of a particular merchant location) or a category of places (e.g., a category of merchants, e.g., restaurant, gas station, etc.).

In some implementations, in response to receiving the search parameters, mobile device 102 can perform a search for nearby locations that match the search parameters. For example, if the search parameters include "gas stations," then GUI 1100 can present map 1104 of a nearby area and present graphical elements 1106 (e.g., a pin, tack, circle, or other graphical object) identifying the locations within the displayed map regions matching the search parameters. If the search parameters include "Bob's Burger Joint," then GUI 1100 can present map 1104 and graphical element 1106 showing the location of "Bob's Burger Joint."

In some implementations, mobile device 102 can present a location-based GUI in response to a user selection of a location on GUI 1100. For example, when GUI 1100 presents graphical element 1100 identifying a merchant location (e.g., "Bob's Burger Joint"), a user can provide input (e.g., touch input) selecting graphical element 1100 to cause GUI 1100 to present graphical element 1108 (e.g., popup window, overlay, bubble, etc.) that includes additional information (e.g., distance from current location of mobile device 102, name of the store at the merchant location, etc.) about the merchant location. In some implementations, the user can select graphical element 1108 to invoke application 106 and cause application 106 to present a location based graphical user interface. For example, application 106 can present GUI 300 or GUI 700 in response to detecting a user selection of graphical element 1108.

Example Processes

Figure 12:
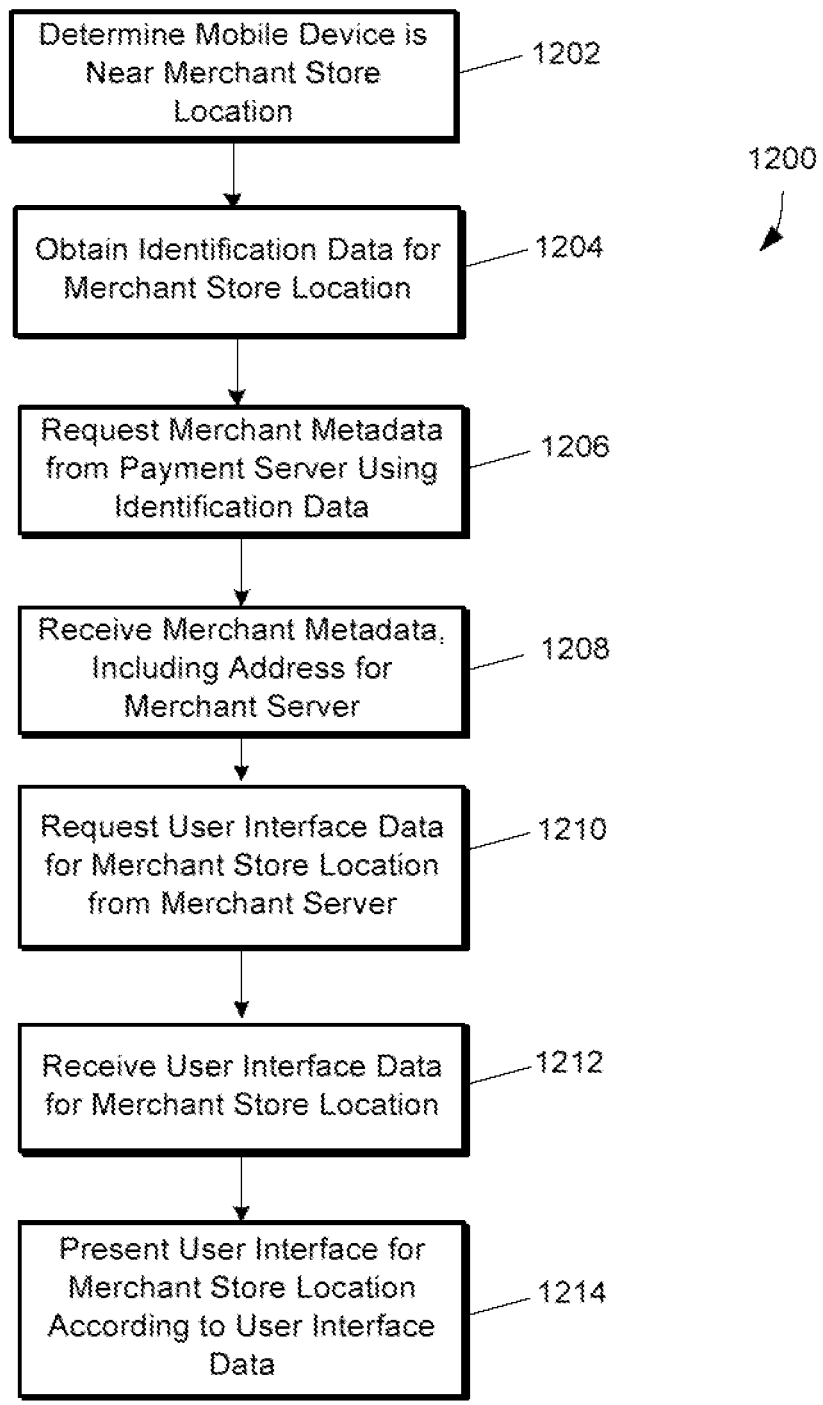
FIG. 12 is flow diagram of an example process for presenting a location-based graphical user interface.

FIG. 12 is flow diagram of an example process 1200 for presenting a location-based graphical user interface. For example, process 1200 can be implemented by mobile device 102 to present a customized graphical user interface for a merchant store location when mobile device 102 detects that mobile device 102 is proximate to the merchant store location.

At step 1202, mobile device 102 can determine that mobile device 102 is near a merchant store location. For example, mobile device 102 can determine that mobile device 102 is near merchant store location 110. Merchant store location 110 can correspond to a gas station, a grocery store, a restaurant, or any other type of location or business where goods or services are sold. Mobile device 102 can determine that mobile device 102 is near (e.g., proximate to) merchant store location 110 based on a signal (e.g., beacon signal) received from merchant store location 110. Mobile device 102 can determine that mobile device 102 is near merchant store location based on a signal (e.g., GNSS signal, Wi-Fi signal, cellular signal, etc.) received from one or more navigational satellites, Wi-Fi access points, cellular signals or similar radio technologies according to known location determination technologies.

At step 1204, mobile device 102 can obtain identification data for the merchant store location. For example, mobile device 102 can obtain identification data for merchant store location 110 from a beacon signal received from beacon 112. The identification data can include a merchant Wi-Fi access point identifier, a merchant identifier, and/or a merchant store identifier for the merchant store location.

At step 1206, mobile device 102 can request merchant metadata from payment server 120 using the merchant identification data. For example, mobile device 102 can establish a connection with merchant access point 114 using the merchant Wi-Fi access point identifier. After the access point connection is established, mobile device 102 can send a merchant metadata request to payment server 120 through network 150. The merchant metadata request (e.g., merchant validation request) can include the merchant identifier obtained at step 1204, for example. Upon receipt of the merchant metadata request, payment server 120 can determine whether the merchant identifier in the request is valid. For example, payment server 120 can determine whether the merchant identifier is valid by determining whether the merchant identifier corresponds to a merchant that is registered with payment server 120 (e.g., the merchant identifier is in merchant metadata database 122). If payment server 120 determines that the merchant identifier is valid, payment server 120 can obtain merchant metadata corresponding to the merchant identifier and send the merchant metadata to mobile device 102.

At step 1208, mobile device 102 can receive the merchant metadata from payment server 120. For example, the merchant metadata can include a network address (e.g., URL, IP address, etc.) for merchant server 130. The merchant metadata can include an image (e.g., icon, graphic, photo, etc.) representing the merchant. In some implementations, mobile device 102 can present the representative image on a display of mobile device 102. For example, mobile device 102 can present the representative image upon receipt of the image from merchant server 130. A user of mobile device 102 can manipulate (e.g., select, tap, drag, swipe, etc.) the representative image to cause application 106 to present a templatized GUI that has been customized with merchant-specific content, as described herein.

At step 1210, mobile device 102 can request graphical user interface data for merchant store location 110 from merchant server 130. For example, mobile device 102 can send the request to merchant server 130 at the network address received in the merchant metadata. In some implementations, the GUI data request can include a store identifier. For example, a merchant may operate multiple stores. The merchant may wish to present different content for different store locations. For example, prices might be different from store to store. The items offered for purchase may be different from store to store. Merchant server 130 (or database 132) can associate the GUI content data for each store with the corresponding store identifier. Thus, the merchant server 130 can use the store identifier in the GUI data request to obtain the GUI data for the identified store.

At step 1212, mobile device 102 can receive the requested GUI data for the merchant store location. For example, the GUI data can include the merchant store identifier, a merchant store type, and/or content for populating a GUI template for the merchant store type.

At step 1214, mobile device 102 present a graphical user interface for the merchant store location according to the graphical user interface data for the merchant store location. For example, mobile device 102 (e.g., application 106) can obtain a GUI template corresponding to the merchant store type, as described above. Mobile device 102 can populate the GUI template with the merchant store location GUI content received at step 1212. Mobile device 102 can generate a GUI for the merchant store location based on the GUI template and the GUI content data and present the merchant GUI on a display of the mobile device.

In some implementations, steps 1202-1212 of process 1200 above can be performed automatically and without user intervention or input. For example, because application 106 can come installed with the operating system of mobile device 102, there may be no need for the user to install application 106 on mobile device 102. Additionally, the operations performed to obtain the merchant GUI content data can be performed automatically in response to determining that mobile device 102 is proximate to merchant store location 110. Thus, application 106 can be configured with the correct store information without requiring input from the user to select the appropriate store.

Example System Architecture

Figure 13:
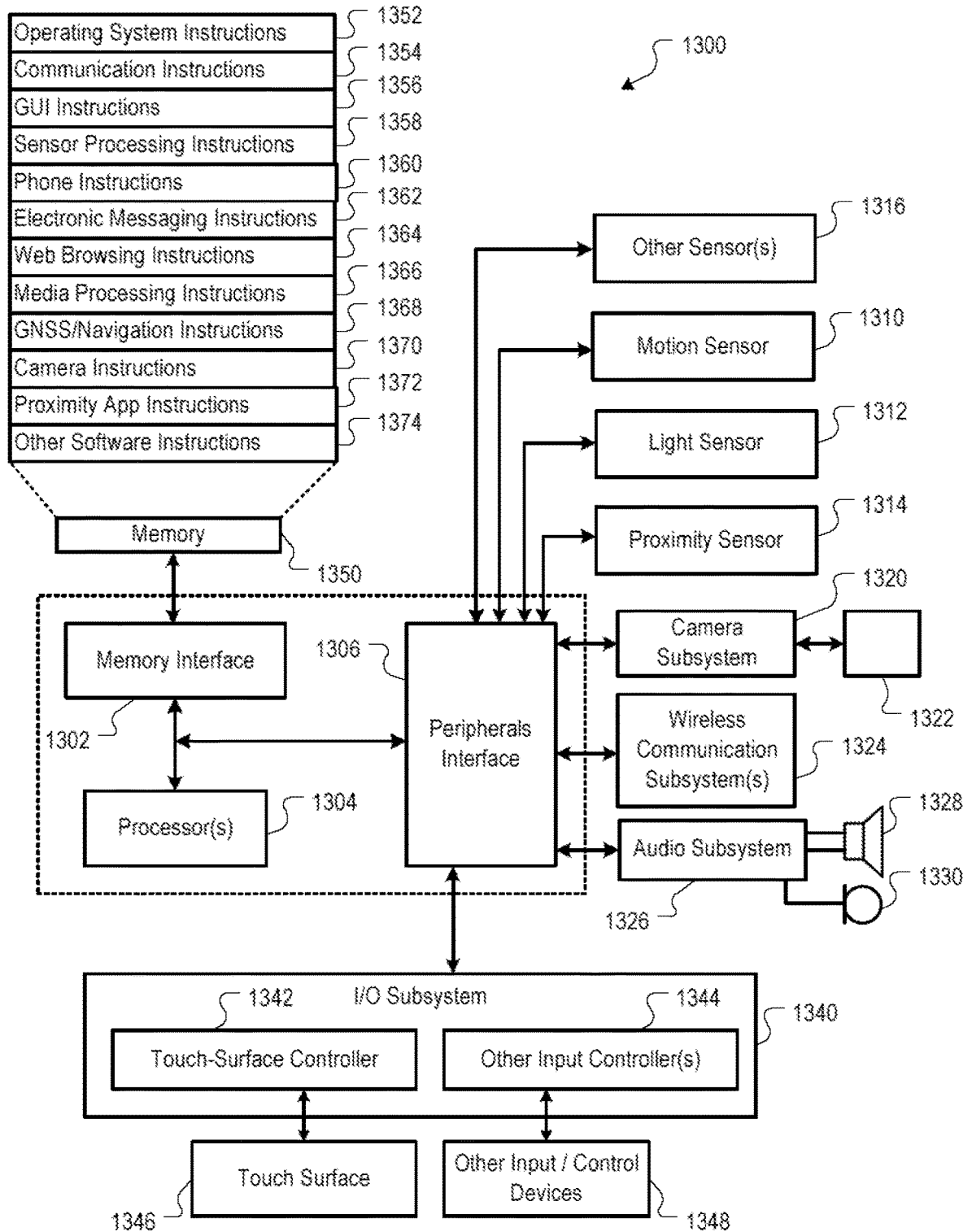
FIG. 13 is a block diagram of an exemplary system architecture implementing the features and processes of FIGS. 1-12.

FIG. 13 is a block diagram of an example computing device 1300 that can implement the features and processes of FIGS. 1-12. The computing device 1300 can include a memory interface 1302, one or more data processors, image processors and/or central processing units 1304, and a peripherals interface 1306. The memory interface 1302, the one or more processors 1304 and/or the peripherals interface 1306 can be separate components or can be integrated in one or more integrated circuits. The various components in the computing device 1300 can be coupled by one or more communication buses or signal lines.

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate orientation, lighting, and proximity functions. Other sensors 1316 can also be connected to the peripherals interface 1306, such as a global navigation satellite system (GNSS) (e.g., GPS receiver), a temperature sensor, a biometric sensor, magnetometer or other sensing device, to facilitate related functionalities.

A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips. The camera subsystem 1320 and the optical sensor 1322 can be used to collect images of a user to be used during authentication of a user, e.g., by performing facial recognition analysis.

Communication functions can be facilitated through one or more wireless communication subsystems 1324, which can include radio frequency receivers and transmitters and/or optical (e.g., infrared) receivers and transmitters. The specific design and implementation of the communication subsystem 1324 can depend on the communication network(s) over which the computing device 1300 is intended to operate. For example, the computing device 1300 can include communication subsystems 1324 designed to operate over a GSM network, a GPRS network, an EDGE network, a Wi-Fi or WiMax network, and a Bluetooth™ network. In particular, the wireless communication subsystems 1324 can include hosting protocols such that the device 100 can be configured as a base station for other wireless devices.

An audio subsystem 1326 can be coupled to a speaker 1328 and a microphone 1330 to facilitate voice-enabled functions, such as speaker recognition, voice replication, digital recording, and telephony functions. The audio subsystem 1326 can be configured to facilitate processing voice commands, voiceprinting and voice authentication, for example.

The I/O subsystem 1340 can include a touch-surface controller 1342 and/or other input controller(s) 1344. The touch-surface controller 1342 can be coupled to a touch surface 1346. The touch surface 1346 and touch-surface controller 1342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1346.

The other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of the speaker 1328 and/or the microphone 1330.

In one implementation, a pressing of the button for a first duration can disengage a lock of the touch surface 1346; and a pressing of the button for a second duration that is longer than the first duration can turn power to the computing device 1300 on or off. Pressing the button for a third duration can activate a voice control, or voice command, module that enables the user to speak commands into the microphone 1330 to cause the device to execute the spoken command. The user can customize a functionality of one or more of the buttons. The touch surface 1346 can, for example, also be used to implement virtual or soft buttons and/or a keyboard.

In some implementations, the computing device 1300 can present recorded audio and/or video files, such as MP3, AAC, and MPEG files. In some implementations, the computing device 1300 can include the functionality of an MP3 player, such as an iPod™. The computing device 1300 can, therefore, include a 36-pin connector that is compatible with the iPod. Other input/output and control devices can also be used.

The memory interface 1302 can be coupled to memory 1350. The memory 1350 can include high-speed random access memory and/or non-volatile memory, such as one or more magnetic disk storage devices, one or more optical storage devices, and/or flash memory (e.g., NAND, NOR). The memory 1350 can store an operating system 1352, such as Darwin, RTXC, LINUX, UNIX, OS X, WINDOWS, or an embedded operating system such as VxWorks.

The operating system 1352 can include instructions for handling basic system services and for performing hardware dependent tasks. In some implementations, the operating system 1352 can be a kernel (e.g., UNIX kernel). In some implementations, the operating system 1352 can include instructions for performing voice authentication. For example, operating system 1352 can implement the location-based graphical user interface features as described with reference to FIGS. 1-12.

The memory 1350 can also store communication instructions 1354 to facilitate communicating with one or more additional devices, one or more computers and/or one or more servers. The memory 1350 can include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GNSS/Navigation instructions 1368 to facilitate GNSS and navigation-related processes and instructions; and/or camera instructions 1370 to facilitate camera-related processes and functions.

The memory 1350 can store other software instructions 1372 to facilitate other processes and functions, such as the location-based graphical user interface processes and functions as described with reference to FIGS. 1-12.

The memory 1350 can also store other software instructions 1374, such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions of the computing device 1300 can be implemented in hardware and/or in software, including in one or more signal processing and/or application specific integrated circuits.

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

What is claimed is:

1. A method implemented using a mobile device, comprising one or more processors and a memory device, the method comprising:
   receiving, by the mobile device, a wireless beacon message from within a location located near the mobile device including identification data for the location, wherein the location is associated with a merchant;
   automatically presenting, in response to the wireless beacon message, by the mobile device, a graphical object notification incorporating a representative image, provided by the merchant, for the location displayed concurrently with at least a portion of a system user interface for the mobile device;
   in response to a selection of the representative image displayed concurrently with at least the portion of the system user interface for the mobile device, ceasing to display the portion of the system user interface and displaying an application corresponding to the location, wherein displaying the application corresponding to the location includes concurrently displaying:
      graphical user interface content provided by the merchant; and
      an icon for invoking a biometric authentication user interface;
   while displaying the application corresponding to the location and after detecting selection of one or more options in the application corresponding to the location, receiving an input corresponding to selection of the icon for invoking the biometric authentication user interface;
   in response to receiving the input corresponding to selection of the icon for invoking the biometric authentication user interface, displaying a biometric authentication user interface in place of at least a portion of the application corresponding to the location;
   while displaying the biometric authentication user interface, detecting, via one or more biometric sensors of the mobile device, biometric data; and
   in accordance with a determination that the biometric data satisfies biometric authentication criteria, authorizing a transaction between the mobile device and the merchant based on one or more options selected in the application corresponding to the location.

2. The method of claim 1, wherein a payment server stores merchant metadata in a merchant metadata database during a registration process for the merchant with the payment server, and further comprising:
   requesting, from the payment server, merchant metadata for the location corresponding to the identification data;
   requesting, by the mobile device from a merchant server, the graphical user interface content for the location based on a merchant server address; and
   receiving, by the mobile device from the merchant server, the graphical user interface content for the location.

3. The method of claim 1, further comprising:
   based on the wireless beacon message, determining, by the mobile device, that the mobile device is near a location associated with the merchant.

4. The method of claim 3, wherein the wireless beacon message includes a wireless access point identifier, and further comprising:
   establishing, by the mobile device, a wireless network connection to an access point at the location based on the access point identifier received in the wireless beacon message.

5. The method of claim 1, wherein the graphical user interface content for the location includes a graphical user interface template identifier, and further comprising:
   obtaining, by the mobile device, a graphical user interface template corresponding to the graphical user interface template identifier; and
   presenting, by the application on the mobile device, the graphical user interface content for the location according to the graphical user interface template.

6. The method of claim 1, further comprising:
   presenting, by the application on the mobile device, a first graphical user interface content corresponding to a first location when the mobile device detects that the mobile device is near the first location; and
   presenting, by the application on the mobile device, a second graphical user interface content corresponding to a second location when the mobile device detects that the mobile device is near the second location.

7. The method of claim 1, further comprising:
   presenting, by the application on the mobile device, a first graphical user interface content corresponding to a first location according to a first graphical user interface template when the mobile device detects that the mobile device is near the first location; and
   presenting, by the application on the mobile device, a second graphical user interface content corresponding to a second location according to a second graphical user interface template when the mobile device detects that the mobile device is near the second location.

8. A non-transitory computer-readable medium including one or more sequences of instructions that, when executed by one or more processors of a mobile device, causes:
   receiving, by the mobile device, a wireless beacon message from within a location located near the mobile device including identification data for the location, wherein the location is associated with a merchant;
   automatically presenting, in response to the wireless beacon message, by the mobile device, a graphical object notification incorporating a representative image, provided by the merchant, for the location displayed concurrently with at least a portion of a system user interface for the mobile device
   in response to a selection of the representative image displayed concurrently with at least the portion of the system user interface for the mobile device, ceasing to display the portion of the system user interface and displaying an application corresponding to the location, wherein displaying the application corresponding to the location includes concurrently displaying:
      graphical user interface content provided by the merchant; and
      an icon for invoking a biometric authentication user interface;
   while displaying the application corresponding to the location and after detecting selection of one or more options in the application corresponding to the location, receiving an input corresponding to selection of the icon for invoking the biometric authentication user interface;

in response to receiving the input corresponding to selection of the icon for invoking the biometric authentication user interface, displaying a biometric authentication user interface in place of at least a portion of the application corresponding to the location;

while displaying the biometric authentication user interface, detecting, via one or more biometric sensors of the mobile device, biometric data; and in accordance with a determination that the biometric data satisfies biometric authentication criteria, authorizing a transaction between the mobile device and the merchant based on one or more options selected in the application corresponding to the location.

9. The non-transitory computer-readable medium of claim 8, wherein a payment server stores merchant metadata in a merchant metadata database during a registration process for the merchant with the payment server, and wherein the instructions cause:

requesting, from the payment server, merchant metadata for the location corresponding to the identification data;

requesting, by the mobile device from a merchant server, the graphical user interface content for the location based on a merchant server address; and receiving, by the mobile device from the merchant server, the graphical user interface content for the location.

10. The non-transitory computer-readable medium of claim 9, wherein the graphical user interface content for the location includes a graphical user interface template identifier, and wherein the instructions cause:

obtaining, by the mobile device, a graphical user interface template corresponding to the graphical user interface template identifier; and presenting, by the application on the mobile device, the graphical user interface content for the location according to the graphical user interface template.

11. The non-transitory computer-readable medium of claim 8, wherein the instructions cause:

based on the wireless beacon message, determining, by the mobile device, that the mobile device is near a location associated with the merchant.

12. The non-transitory computer-readable medium of claim 11, wherein the wireless beacon message includes a wireless access point identifier, and wherein the instructions cause:

establishing, by the mobile device, a wireless network connection to an access point at the location based on the access point identifier received in the wireless beacon message.

13. The non-transitory computer-readable medium of claim 8, wherein the instructions cause:

presenting, by the application on the mobile device, a first graphical user interface content corresponding to a first location when the mobile device detects that the mobile device is near the first location; and presenting, by the application on the mobile device, a second graphical user interface content corresponding to a second location when the mobile device detects that the mobile device is near the second location.

14. The non-transitory computer-readable medium of claim 8, wherein the instructions cause:

presenting, by the application on the mobile device, a first graphical user interface content corresponding to a first location according to a first graphical user interface template when the mobile device detects that the mobile device is near the first location; and presenting, by the application on the mobile device, a second graphical user interface content corresponding to a second location according to a second graphical user interface template when the mobile device detects that the mobile device is near the second location.

15. A mobile device, comprising: one or more processors; and a non-transitory computer-readable medium including one or more sequences of instructions that, when executed by the one or more processors, causes:

receiving, by the mobile device, a wireless beacon message from within a location located near the mobile device including identification data for the location, wherein the location is associated with a merchant;

automatically presenting, in response to the wireless beacon message, by the mobile device, a graphical object notification incorporating a representative image, provided by the merchant, for the location displayed concurrently with at least a portion of a system user interface for the mobile device in response to a selection of the representative image displayed concurrently with at least the portion of the system user interface for the mobile device, ceasing to display the portion of the system user interface and displaying an application corresponding to the location, wherein displaying the application corresponding to the location includes concurrently displaying:

graphical user interface content provided by the merchant; and an icon for invoking a biometric authentication user interface;

while displaying the application corresponding to the location and after detecting selection of one or more options in the application corresponding to the location, receiving an input corresponding to selection of the icon for invoking the biometric authentication user interface;

in response to receiving the input corresponding to selection of the icon for invoking the biometric authentication user interface, displaying a biometric authentication user interface in place of at least a portion of the application corresponding to the location;

while displaying the biometric authentication user interface, detecting, via one or more biometric sensors of the mobile device, biometric data; and in accordance with a determination that the biometric data satisfies biometric authentication criteria, authorizing a transaction between the mobile device and the merchant based on one or more options selected in the application corresponding to the location.

16. The mobile device of claim 15, wherein a payment server stores merchant metadata in a merchant metadata database during a registration process for the merchant with the payment server, and wherein the instructions cause:

requesting, from the payment server, merchant metadata for the location corresponding to the identification data;

requesting, by the mobile device from a merchant server, the graphical user interface content for the location based on a merchant server address; and receiving, by the mobile device from the merchant server, the graphical user interface content for the location.

17. The mobile device of claim 16, wherein the graphical user interface content for the location includes a graphical user interface template identifier, and wherein the instructions cause: obtaining, by the mobile device, a graphical user interface template corresponding to the graphical user interface template identifier; and presenting, by the application on the mobile device, the graphical user interface content for the location according to the graphical user interface template.

18. The mobile device of claim 15, wherein the instructions cause:
based on the wireless beacon message, determining, by the mobile device, that the mobile device is near a location associated with the merchant.

19. The mobile device of claim 18, wherein the wireless beacon message includes a wireless access point identifier, and wherein the instructions cause:
establishing, by the mobile device, a wireless network connection to an access point at the location based on the access point identifier received in the wireless beacon message.

20. The mobile device of claim 15, wherein the instructions cause:
presenting, by the application on the mobile device, a first graphical user interface content corresponding to a first location when the mobile device detects that the mobile device is near the first location; and
presenting, by the application on the mobile device, a second graphical user interface content corresponding to a second location when the mobile device detects that the mobile device is near the second location.

* * * * *